April 28, 1931.  W. STUEBING, JR  1,803,079
LIFTING TRUCK
Original Filed April 30, 1928   2 Sheets-Sheet 1
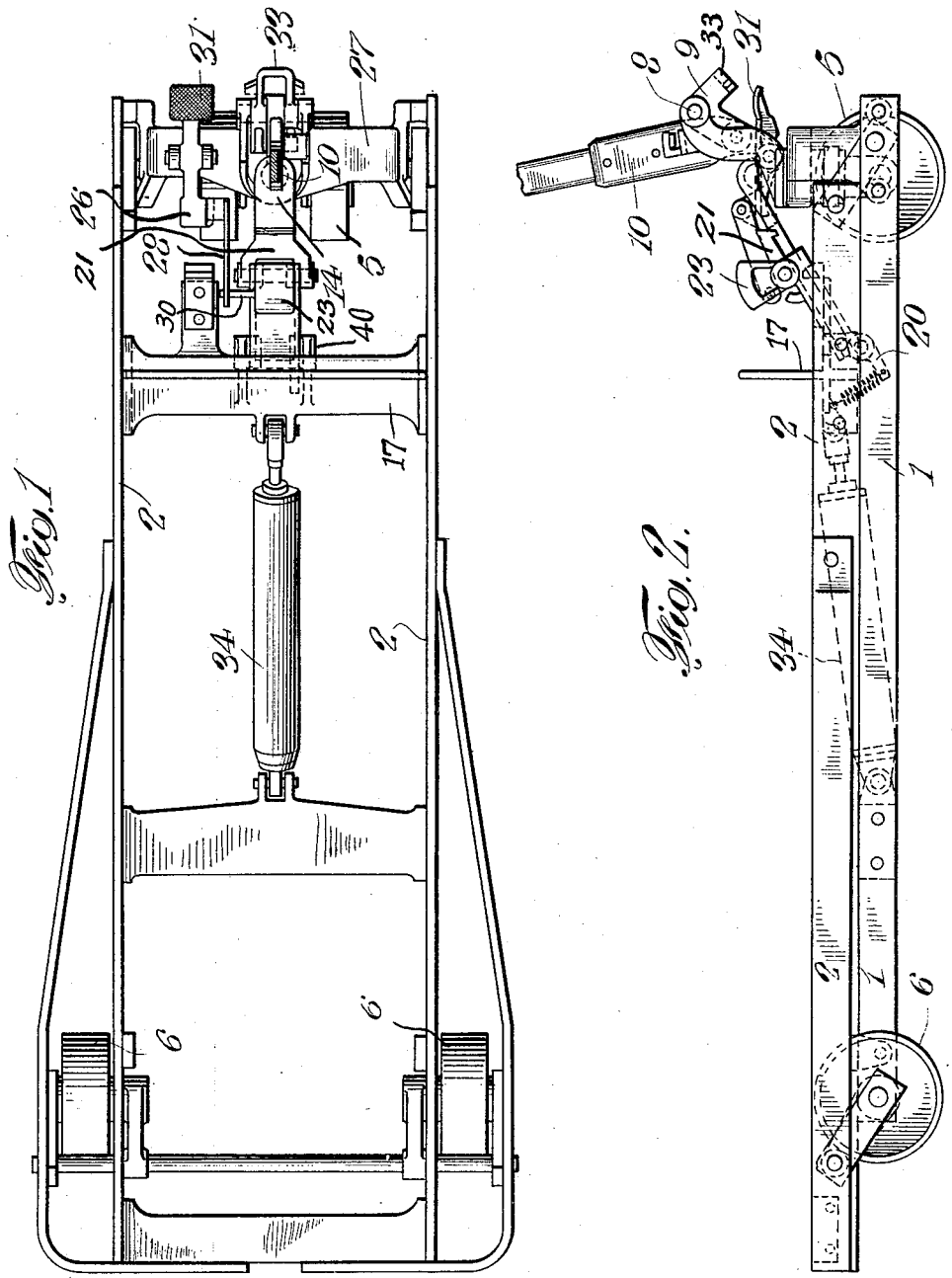
Inventor
William Stuebing, Jr.
By his Attorney
Emery, Booth, Janney & Varney

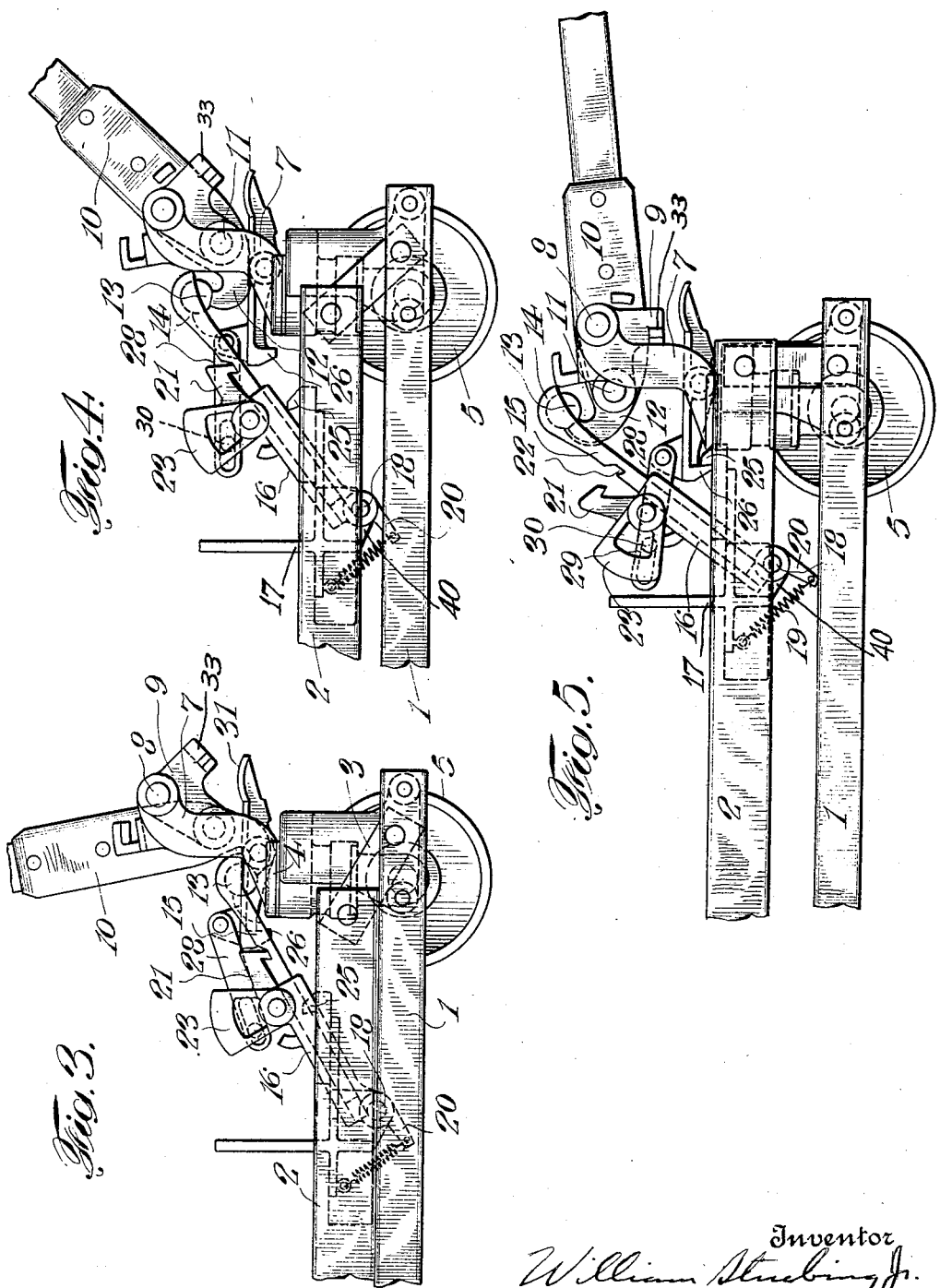

Patented Apr. 28, 1931

1,803,079

UNITED STATES PATENT OFFICE

WILLIAM STUEBING, JR., OF CINCINNATI, OHIO

LIFTING TRUCK

Application filed April 30, 1928, Serial No. 273,826. Renewed September 30, 1930.

This invention relates to lifting trucks, and has as an object to provide a truck which may be operated to lift a load by a single movement of the steering handle in a vertical plane, but which may be so operated when the said steering handle is located in any steering position.

It is a further object of the invention to provide a truck which shall be simple and inexpensive to manufacture but which shall be reliable in operation, and which shall incorporate certain safety features designed to prevent accident in use.

Other objects and advantages of the invention will appear hereinafter.

A preferred embodiment of the invention selected for purposes of illustration is shown in the accompanying drawings, in which, Figure 1 is a top plan view of the truck.

Figure 2 is a side elevation, and

Figures 3, 4 and 5 are enlarged side elevations of the operating end of the truck, showing the lifting mechanism in different stages of operation, Figure 3 showing the truck ready for lifting, Figure 4 showing the platform partially elevated, and Figure 5 showing the platform completely elevated and the lifting mechanism disengaged by slight upward movement of the steering tongue.

Referring to the drawings, the truck comprises a lower main frame and an upper elevating or lifting frame 2 which is pivotally mounted on the main frame by means of links 3. Mounted on the main frame is a steering swivel 4 carrying a pair of steering wheels 5 which support the forward end of the truck, while the rear end is supported by wheels 6. Mounted on the swivel 4 to turn therewith is a bracket in the form of a fork 7 which provides a bearing for transverse shaft 8 formed integrally with a saddle 9. The handle 10 is fulcrumed on the saddle 9 by means of the shaft 11.

The handle 10 is provided with a rearward extension 12 terminating in a ball 13 which is so arranged that it lies in the region of center line of the axis of the steering swivel at all times. The said ball is adapted to receive the socketed end 14 of the bar 15, the other end of the said bar being received and supported within the sleeve 16. Sleeve 16 is pivotally mounted upon a bracket 40 extending forwardly from the saddle 17 of the elevating frame by means of shaft 18, and the spring 19 which has one end secured to an arm 20 formed integral with the sleeve 16 and its other end secured to the saddle 17 serves to retain the said bar 15 in engagement with the ball 13 at all times.

Pivotally mounted on the sleeve 16 is a latch 21 which is adapted to cooperate with the notch 22 in the bar 15. The latch is preferably counter-weighted by means of the weight 23 in such manner that when swung into engaging position as illustrated in Figure 3, it will remain in engaged position as long as the handle 10 remains in upright position, but when the handle is swung downwardly to the position illustrated in Figure 5 to elevate the elevating frame, and is then swung upwardly slightly, as to a position for pulling the truck, the latch will automatically disengage, thus permitting the bar 15 to slide freely in the sleeve. Thus the lifting mechanism is automatically disengaged at the end of the lifting operation, so that the danger of the "flying handle" is eliminated.

In order to retain the elevating frame in raised position a lug 25 is mounted thereon which is adapted to be engaged by a latch 26 which is pivotally mounted on the transversely extending member 27 of the main frame 1.

It has also been found desirable to provide means by which the latch 21 may be easily and conveniently moved into operative engagement with the notch 22. Accordingly, the link 28 is pivotally mounted on the latch 26, and a slot 29 in the said link engages a pin 30 extending laterally from the counter-weight 23 of the latch 21, Figure 1. As will be observed, if the latch 21 is out of engagement with the notch 22 when the parts are in the position shown in Figure 3, the operator, by stepping on the treadle extension 31 of the latch 26 may cause the latch 21 to engage the notch 22, and by reason of the counter-weight 23, the said latch will remain in engaged position.

In order to provide for easier lifting operation during the first part of the downward movement of the handle 10 when the handle is in an unfavorable position for the operator to apply his full strength, there may be provided a mechanism for changing the leverage during the lifting operation. As has been previously explained, the handle 10 is pivotally mounted on the saddle 9 which in turn is pivotally mounted on the fork 7. During the first portion of its downward movement the handle fulcrums about the pivot formed by the shaft 11, but after the platform is partially elevated the handle engages the transverse web 33 of the saddle 9, causing the saddle 9 to move with the handle, thus shifting the fulcrum to the shaft 8. Thus the effective lever arm is increased and during the latter part of the lifting operation, when the operator can apply his full strength, and a greater amplitude of movement of the elevating frame is obtained for a given movement of the handle than is obtained during the first part of the lifting operation when the lever arms are shorter.

In operation, if it is desired to raise the elevating frame, the steering handle as swung to vertical position, and if the hook 21 is out of engagement with the notch 22, the operator depresses the treadle 31 causing the hook 21 to be thrown forward so as to engage the notch 22. By then swinging the handle downwardly, the operator is enabled to raise the elevating frame until the lug 25 engages the latch 26, after which the elevating frame is held in raised position by the said latch. If now the operator raises the handle slightly, as to a position for pulling the truck, the hook 21 will be thrown out of the notch 22 so that operative engagement between the handle and the elevating frame is automatically broken. By reason of this feature, if the elevating frame is accidentally lowered while the handle is in the position shown in Figure 5, the handle remains in the position shown and is not thrown violently upward as might otherwise occur.

While in this position the truck may be moved to any desired place, and then, if it is desired to lower the elevating frame and load, the treadle 31 is depressed to disengage the latch 26 from the lug 25. If desired, a hydraulic check 34 may be provided to retard the descent of the elevating frame.

It will be understood that the invention may be variously modified and embodied within the scope of the subjoined claims.

I claim as my invention:

1. In a lifting truck, in combination, a main frame, an elevating frame, a swiveled steering head mounted on said main frame, a steering tongue carried by said steering head, and means including a telescoping link for operatively connecting said tongue and said elevating frame.

2. In a lifting truck, in combination, a main fame, an elevating frame, a swiveled steering head mounted on said main frame, a steering tongue carried by said steering head, means including a telescoping link for connecting said tongue and elevating frame, and means under control of the operator for preventing extension of said link, so that movement of said tongue in a vertical plane may cause forward and upward movement of said elevating frame.

3. In a lifting truck, in combination, a main frame, an elevating frame, a swiveled steering head mounted on said main frame, a steering tongue carried by said steering head, means including a telescoping link for connecting said tongue and elevating frame, means under control of the operator for preventing extension of said link, so that downward movement of said tongue in a vertical plane may cause forward and upward movement of said elevating frame, and means for retaining said last named means in position for preventing extension until the elevating frame is raised, or until removed from such position by the operator.

4. In a lifting truck, in combination, a main frame, an elevating frame, a swiveled steering head mounted on said main frame, a steering tongue carried by said steering head, means including a telescoping link for connecting said tongue and elevating frame, and means mounted on one member of said link and adapted to engage the other member of the link for preventing extension of said link, so that downward movement of said tongue in a vertical plane may cause forward and upward movement of said elevating frame.

5. In a lifting truck, in combination, a main frame, an elevating frame, a swiveled steering head mounted on said main frame, a steering tongue carried by said steering head, means including a telescoping link for connecting said tongue and elevating frame, means mounted on one member of said link and adapted to engage the other member of the link for preventing extension of said link, so that downward movement of said tongue in a vertical plane may cause forward and upward movement of said elevating frame, and means for retaining said engaging means in engagement until the elevating frame is raised or until removed from engaging position by the operator.

6. In a lifting truck, in combination, a main frame, an elevating frame, a swiveled steering head mounted on said main frame, a steering tongue carried by said steering head, a member pivoted on said elevating frame, and a member pivoted on said steering tongue, said members being slidable one upon the other and forming an extensible link connecting said tongue and elevating frame.

7. In a lifting truck, in combination, a main frame, an elevating frame, a swiveled steering head mounted on said main frame, a steering tongue carried by said steering head, a member pivoted on said elevating frame, a member pivoted on said steering tongue, said members being slidable one upon the other and forming an extensible link connecting said tongue and elevating frame, and means for locking said members against extension so that downward movement of said tongue in a vertical plane may cause forward and upward movement of said elevating frame 8. In a lifting truck, in combination, a main frame, an elevating frame, a swiveled steering head mounted on said main frame, a steering tongue carried by said steering head, a member pivoted on said elevating frame, a member pivoted on said steering tongue, said members being slidable one upon the other and forming an extensible link connecting said tongue and elevating frame, means for locking said members against extension so that downward movement of said tongue in a vertical plane may cause forward and upward movement of said elevating frame, and means for releasing said locking means upon slight upward movement of said tongue after said elevating frame is completely elevated.

9. In a lifting truck, in combination, a main frame, a swiveled steering head, a saddle pivotally mounted on said steering head, a steering tongue pivotally mounted on said saddle, and means whereby said tongue fulcrums on said saddle during part of the downward swing thereof and said tongue and saddle fulcrum on said steering head during the remainder of the downward swing of the tongue.

10. In a lifting truck, the combination of a main frame, a steering tongue and supporting means for said tongue including a bracket mounted for rotation in relation to said frame, and a saddle having pivotal connection with said bracket, said tongue having pivotal connection with said saddle, and said saddle having a portion exposed in the path of movement of said tongue, whereby the tongue during part of its downward swing fulcrums on its pivotal connection with the saddle and during another part of its downward swing fulcrums on the pivotal connection of the saddle with said bracket.

11. In a lifting truck, in combination, a frame, a swivelled steering head, a support pivotally mounted on said steering head, a lifting tongue pivotally mounted on said support, and means whereby said tongue fulcrums on said support during part of the operating swing thereof and said tongue and said support fulcrum on said steering head during the remainder of the swing of the tongue.

In testimony whereof, I have signed my name to this specification this 26th day of April, 1928.

WILLIAM STUEBING, Jr.